US009763129B2

(12) United States Patent
Xia et al.

(10) Patent No.: US 9,763,129 B2
(45) Date of Patent: Sep. 12, 2017

(54) METHOD AND TERMINAL FOR HANDLING CHANNEL STATE INFORMATION

(71) Applicant: Huawei Technologies Co., Ltd., Shenzhen, Guangdong (CN)

(72) Inventors: Liang Xia, Shenzhen (CN); Xiaotao Ren, Shenzhen (CN); Yongxing Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 14/581,197

(22) Filed: Dec. 23, 2014

(65) Prior Publication Data
US 2015/0109949 A1    Apr. 23, 2015

Related U.S. Application Data

(63) Continuation of application No. PCT/CN2012/084011, filed on Nov. 2, 2012.

(30) Foreign Application Priority Data

Jun. 28, 2012    (WO) ................ PCT/CN2012/077705

(51) Int. Cl.
*H04W 24/10*    (2009.01)
*H04L 1/00*    (2006.01)
(Continued)

(52) U.S. Cl.
CPC ............ *H04W 24/10* (2013.01); *H04B 7/063* (2013.01); *H04B 7/0626* (2013.01);
(Continued)

(58) Field of Classification Search
CPC ... H04W 24/10; H04W 28/04–28/048; H04W 72/082–72/085; H04W 72/1231; H04B 7/0626
See application file for complete search history.

(56) References Cited

U.S. PATENT DOCUMENTS

| 2011/0032839 A1 | 2/2011 | Chen et al. |
| 2012/0243440 A1 | 9/2012 | Zhang |

(Continued)

FOREIGN PATENT DOCUMENTS

| CN | 101998420 A | 3/2011 |
| CN | 102118863 A | 7/2011 |

(Continued)

*Primary Examiner* — Eric Myers
(74) *Attorney, Agent, or Firm* — Leydig, Voit & Mayer, Ltd.

(57) ABSTRACT

Provided in embodiments of the present application are a method and terminal for handling CSI. The embodiments of the present invention use the terminal to measure and report to a base station first CSI, where the first CSI comprises a first RI, a first PMI, and a first CQI, to acquire a second RI and/or a second PMI on the basis of the first CSI, thus allowing the terminal to utilize the second RI to measure and report to the base station the PMI and CQI corresponding to the second RI; or, the terminal utilizes the second RI and the second PMI to measure and report to the base station the CQI corresponding to the second RI and to the second PMI; or, the terminal utilizes the second PMI to measure and report to the base station the RI and CQI corresponding to the second PMI.

19 Claims, 2 Drawing Sheets

(51) Int. Cl.
    *H04B 7/06*       (2006.01)
    *H04W 28/04*      (2009.01)
    *H04W 72/12*      (2009.01)
    *H04L 1/06*       (2006.01)

(52) U.S. Cl.
    CPC ......... *H04B 7/0639* (2013.01); *H04L 1/0026* (2013.01); *H04L 1/06* (2013.01); *H04W 28/04* (2013.01); *H04W 72/1231* (2013.01)

(56) References Cited

U.S. PATENT DOCUMENTS

2013/0188591 A1* 7/2013 Ko ..................... H04B 7/0626
                                                    370/329
2013/0223272 A1   8/2013 Tao et al.

FOREIGN PATENT DOCUMENTS

| CN | 102255685 A | 11/2011 |
| CN | 102271031 A | 12/2011 |
| CN | 102291223 A | 12/2011 |
| CN | 102291764 A | 12/2011 |
| EP | 2741440 A1 | 6/2014 |
| WO | WO 2008116027 A2 | 9/2008 |
| WO | WO 2010147416 A2 | 12/2010 |

* cited by examiner

METHOD AND TERMINAL FOR HANDLING CHANNEL STATE INFORMATION

CROSS-REFERENCE TO RELATED APPLICATIONS

This application is a continuation of International Patent Application No. PCT/CN2012/084011, filed on Nov. 2, 2012, which claims the priority to International Application No. PCT/CN2012/077705, filed on Jun. 28, 2012, both of which are hereby incorporated by reference in their entireties.

TECHNICAL FIELD

The application relates to communication technology, and particularly to a method for processing channel status information (CSI) and a terminal.

BACKGROUND

In a wireless communication system such as a long term evolution (LTE) system, multiple transmission points (TP) may service a terminal simultaneously due to introduction of coordinated multiple points (CoMP) technology, carrier aggregation (CA) technology and so on. The TP may include but is not limited to an access point (AP), a base station, a cell of a base station, a carrier frequency, a carrier, a remote radio equipment (RRE), a remote radio head (RRH), a remote radio unit (RRU) or a home base station (Femto cell, Home NodeB, HNB or Home eNodeB, HeNB). A user equipment (UE) may measure channel status information (CSI) under various conditions and report the CSI to an evolved NodeB (eNB), such that the eNB can configure the related TP according to the CSI under each conditions reported by the UE. For example, in one condition, TP1 is a signal TP for transmitting a downlink signal to a UE, and the signal TP transmits the downlink signal with a transmitting power of P1; TP2 is an interference TP interfering with the UE or the interference TP does not transmit a downlink signal. In another condition, TP2 is a signal TP for transmitting a downlink signal to the UE, and the signal TP transmits the downlink signal with a transmitting power of P2; TP1 is an interference TP interfering with the UE or the interference TP does not transmit a downlink signal.

However, since the terminal needs to measure the CSI under each condition, the complexity of the terminal is high.

SUMMARY

Multiple aspects of the application provide a method for processing CSI and a terminal, to reduce the complexity of the terminal.

In an aspect of the application, it is provided a method for processing CSI, including:

measuring, by a terminal, first CSI and reporting the first CSI to a base station, where the first CSI includes a first RI, a first PMI and a first CQI;

obtaining, by the terminal, a second RI and/or a second PMI according to the first CSI; and measuring, by the terminal, a PMI and a CQI that correspond to the second RI by using the second RI and reporting the PMI and the CQI that correspond to the second RI to the base station; or measuring, by the terminal, a CQI that corresponds to the second RI and the second PMI by using the second RI and the second PMI and reporting the CQI that corresponds to the second RI and the second PMI to the base station, or measuring, by the terminal, an RI and a CQI that correspond to the second PMI by using the second PMI and reporting the RI and the CQI that correspond to the second PMI to the base station.

In another aspect of the application, it is provided a terminal, including:

a measuring and reporting unit, configured to measure first CSI and report the first CSI to a base station, where the first CSI includes a first RI, a first PMI and a first CQI; and a processing unit, configured to obtain a second RI and/or a second PMI according to the first CSI;

the measuring and reporting unit is further configured to: measure a PMI and a CQI that correspond to the second RI by using the second RI and report the PMI and the CQI that correspond to the second RI to the base station; or measure a CQI that corresponds to the second RI and the second PMI by using the second RI and the second PMI and report the CQI that corresponds to the second RI and the second PMI to the base station; or measure an RI and a CQI that correspond to the second PMI by using the second PMI and report the RI and the CQI that correspond to the second PMI to the base station.

According to the above solutions in the embodiments of the application, first CSI including a first RI, a first PMI and a first CQI is measured and reported to a base station by the terminal; a second RI and/or a second PMI are obtained according to the first CSI, such that the terminal can measure a PMI and a CQI that correspond to the second RI by using the second RI and report the PMI and the CQI to the base station, or the terminal can measure a CQI that corresponds the second RI and the second PMI by using the second RI and the second PMI and report the CQI to the base station, or the terminal can measure an RI and a CQI that correspond to the second PMI by using the second PMI and report the RI and the CQI to the base station. In this way, the terminal does not need to measure all content in the CSI under each condition, thus the complexity of the terminal is reduced.

BRIEF DESCRIPTION OF DRAWINGS

In order to illustrate the technical solutions in the embodiments of the application more clearly, hereinafter the accompanying drawings for the description of the embodiments will be introduced simply. Obviously, the accompanying drawings in the following description are only some embodiments of the application, and other accompanying drawings may be obtained based on these accompanying drawings by those skilled in the art without any creative work.

DETAILED DESCRIPTION OF EMBODIMENTS

In order to make the objects, the technical solutions and the advantages of the embodiments of the application more clearly, hereinafter the technical solutions in the embodiments of the application will be described clearly in conjunction with the accompanying drawings in the embodiments of the application. Obviously, the described embodiments are only some embodiments of the application, not all the embodiments. All of the other embodiments obtained by those skilled in the art without any creative work fall within the scope of protection of the disclosure.

In addition, the term "and/or" herein only represents an association relationship of associated objects, which includes three relations. For example, A and/or B may represent only A exists, both A and B exist or only B exists. In addition, the character "/" herein generally represents a relationship of "or" between the associated objects.

Figure 1:
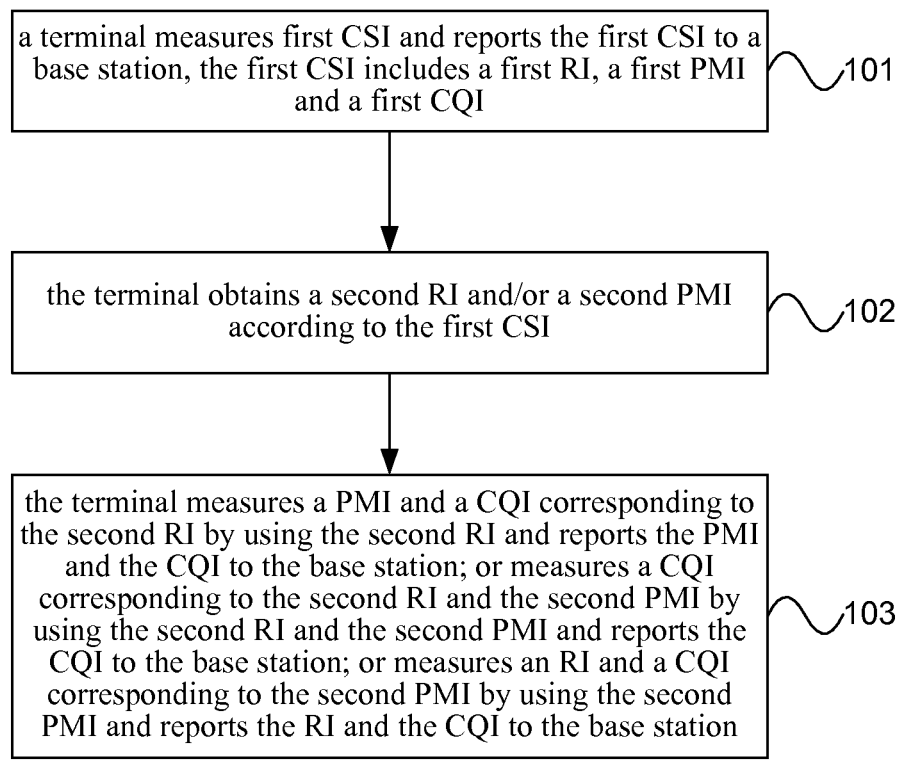
FIG. 1 is a schematic flowchart showing a method for processing CSI according to an embodiment of the application.

FIG. 1 is a schematic flowchart illustrating a method for processing CSI according to an embodiment of the application. FIG. 1 includes the following steps 101 to 103.

In step 101, a terminal measures first CSI and reports the first CSI to a base station, where the first CSI includes a first rank indicator (RI), a precoding matrix indicator (PMI) and a channel quality indicator (CQI).

In step 102, the terminal obtains a second RI and/or a second PMI according to the first CSI.

In step 103, the terminal measures a PMI and a CQI that correspond to the second RI by using the second RI and reports the PMI and the CQI to the base station; or the terminal measures a CQI that corresponds to the second RI and the second PMI by using the second RI and the second PMI and reports the CQI to the base station; or the terminal measures an RI and a CQI that correspond to the second PMI by using the second PMI and reports the RI and the CQI to the base station.

It should be noted that, the first RI, the first PMI and the first CQI included in the first CSI are measured according to a first condition, the second RI and the second PMI are calculated according to a second condition, and other CSI information measured by using the second RI and/or the second PMI are measured according to the second condition. A third PMI described in the following is also calculated according to the second condition. The first condition is different from the second condition.

The first condition and the second condition may include various conditions according to the TP. For example, the first condition and the second condition may include a condition about signal and interference, or a condition about time resource and frequency resource. It will be further illustrated below by examples.

For example, in the first condition, TP1 is a signal TP for transmitting a downlink signal to a terminal and the signal TP transmits the downlink signal with a transmitting power of P1; TP2 is an interference TP interfering with the UE or the interference TP does not transmit a downlink signal. In the second condition, TP2 is a signal TP for transmitting a downlink signal to an UE, and the signal TP transmits the downlink signal with a transmitting power of P2; TP1 is an interference TP interfering with the UE or the interference TP does not transmit a downlink signal.

For another example, in the first condition, TP1 transmits a downlink signal to a terminal on the system bandwidth within subframe 0; in the second condition, TP1 transmits a downlink signal to a terminal on the system bandwidth within subframe 5, where 0 and 5 are numbers of subframes.

For another example, in the first condition, TP1 transmits a downlink signal to a terminal on the system bandwidth within subframe 0; in the second condition, TP1 transmits a downlink signal to a terminal on subband 1 and subband 6 within subframe 5, where 0 and 5 are numbers of subframes, 1 and 6 are numbers of subbands, and the subband is a portion of the system bandwidth.

Optionally, in a possible implementation of the embodiment, the terminal performs step 102 and the subsequent steps in a case that the terminal further needs to report multiple CSIs simultaneously, i.e., the terminal may obtain a second RI and/or a second PMI according to the first CSI.

Optionally, in a possible implementation of the embodiment, the terminal may obtain the second RI according to the first CSI in step 102.

Optionally, the terminal may obtain the second RI corresponding to the first RI according to a preset mapping rule between the first RI and the second RI.

Optionally, the terminal may obtain a first offset corresponding to the first RI according to a preset mapping rule between the first RI and the first offset, and take a sum of the first RI and the first offset as the second RI.

Optionally, the terminal may obtain the second RI corresponding to the first RI and the first CQI according to a preset mapping rule among the first RI, the first CQI and the second RI.

Optionally, the terminal may obtain a second offset corresponding to the first RI and the first CQI according to a preset mapping rule among the first RI, the first CQI and the second offset, and take a sum of the first RI and the second offset as the second RI.

Optionally, the terminal may obtain the second RI corresponding to the first RI, the number of antenna ports and the first CQI according to a preset mapping rule among the first RI, the number of antenna ports, the first CQI and the second RI. The number of antenna ports may include but is not limited to the number of receiving antenna ports of the terminal and/or the number of transmitting antenna ports of the base station.

Optionally, the terminal may obtain a third offset corresponding to the first RI, the number of antenna ports and the first CQI according to a preset mapping rule among the first RI, the number of antenna ports, the first CQI and the third offset, and take a sum of the first RI and the third offset as the second RI. The number of antenna ports may include but is not limited to the number of receiving antenna ports of the terminal and/or the number of transmitting antenna ports of the base station.

Before step 102, the terminal may receive one of the mapping rules transmitted by the base station via a high-level signaling. The terminal may obtain all mapping rules mentioned later in this way, which is not described in the following.

For example, the high-level signaling may be a radio resource control (RRC) message, and a mapping rule may be carried by an information element (IE) in the RRC message. The RRC message may be a conventional RRC message such as a RRC connection reconfiguration message, which is not limited in the embodiment. The IE of the conventional RRC message may be extended to carry one of the mapping rules. Alternatively, the RRC message may be different from the conventional RRC message.

For another example, the high-level signaling may be a media access control (MAC) control element (CE) message, and a new MAC CE message may be added to carry one of the mapping rules.

Before step 102, the terminal does not receive one of the mapping rules transmitted by the base station via the high-level signaling, instead the terminal may obtain one of the mapping rules by a pre-configuration such as a protocol agreement. The terminal may obtain all mapping rules mentioned later in this way, which is not described in the following.

Optionally, in a possible implementation of the embodiment, the terminal may obtain the second PMI according to the first CSI in step 102.

The terminal may obtain the second RI according to the first CSI, the detailed description of which may refer to the related content in the possible implementation described above. The terminal may then obtain the second PMI according to the first CSI and the second RI. Specifically, the terminal may obtain the second PMI corresponding to the first PMI and the second RI according to a preset mapping rule among the first PMI, the second RI and the second PMI.

The preset mapping rule among the first PMI, the second RI and the second PMI may include that:

the second PMI may be a PMI which has a minimum distance from the first PMI in a PMI set corresponding to the second RI in a codebook set, and the distance is a distance between the first L column of a precoding matrix indicated by each PMI in the PMI set and the first L column of a precoding matrix indicated by the first PMI, where L is a preset positive integer and L is less than or equal to the smallest one of the first RI and the second RI; or the second PMI may be a PMI which has a maximum correlation value with the first PMI in the PMI set corresponding to the second RI in a codebook set, and the correlation value is a correlation value between the first L column of a precoding matrix indicated by each PMI in the PMI set and the first L column of a precoding matrix indicated by the first PMI, where L is a preset positive integer, and L is less than or equal to the smallest one of the first RI and the second RI.

The terminal may receive a value of the L transmitted by the base station via the high-level signaling, or may obtain a value of the L according to a pre-configuration such as a protocol agreement, which is not limited in the embodiment.

Hereinafter, the preset mapping rule among the first PMI, the second RI and the second PMI will be illustrated in detail according to the mapping rule that the second PMI may be a PMI which has a maximum correlation value with the first PMI in the PMI set corresponding to the second RI in the codebook set.

Provided that a precoding matrix indicated by the first PMI is P1, a precoding matrix indicated by the second PMI is P2, where P1 is a matrix with the number of rows being equal to the number of antenna ports T/R and the number of columns being equal to the first RI, P2 is a matrix with the number of rows being equal to the number of antenna ports T/R and the number of columns being equal to the second RI. The number of antenna ports may include but is not limited to the number of receiving antenna ports of the terminal and/or the number of transmitting antenna ports of the base station.

The terminal traverses precoding matrixes indicated by each PMI in the PMI set corresponding to the second RI in the codebook set (which may be referred to as candidate precoding matrixes). Provided that the currently traversed candidate precoding matrix is P, $A=P^{H}*P_1$ is calculated, where A is a matrix with the number of rows being equal to the second RI and the number of columns being equal to the first RI.

$$\beta = \sum_{i=1}^{L} |a(i,i)|$$

is then calculated, where $a(i,i)$ represents an element in the ith row and the ith column of the matrix A, $|a(i,i)|$ represents the absolute value of $a(i,i)$, L is the smallest one of the first RI and the second RI, $\beta$ is a correlation value between the first L column of the matrix P and the first L column of the matrix P1. The PMI corresponding to the candidate precoding matrix for which the value of $\beta$ is maximum is taken as the second PMI.

If there are multiple candidate precoding matrixes that correspond to the maximum value of $\beta$, a PMI corresponding to one of the multiple candidate precoding matrixes may be selected as the second PMI according to a rule which is predefined or notified via the high-level signaling. For example, the PMI with a minimum value is selected or the PMI is selected according to a rotation rule.

A codebook set of the LTE system is taken as an example. For the mapping rule that the second PMI may be a PMI which has a maximum correlation value with the first PMI in the PMI set corresponding to the second RI in the codebook set, it may be obtained that: in a case that the number of antenna ports equals to 2, the second PMI equals to the first PMI if the second RI equals to the first RI; the second PMI equals to a sum of 1 and a value which is obtained by rounding down a result of dividing the first PMI by 2, i.e., the second PMI=floor (the first PMI/2)+1, if the second RI is greater than the first RI; the second PMI=the first PMI, or the second PMI=(the first PMI-1)×2, or the second PMI=(the first PMI-1)×2+1, if the second RI is less than the first RI; in a case that the number of antenna ports equals to 4, the second PMI=the first PMI.

The terminal may obtain third PMIs corresponding to the PMI and each RI in an RI set in the codebook set according to a preset mapping rule among the first PMI, the RI set and the third PMI. The terminal may then select an optimal third PMI as the second PMI according to the third PMIs. The optimal third PMI may be a third PMI corresponding to a maximum signal-noise ratio measured or calculated according to the third PMIs, or a third PMI corresponding to a maximum CQI measured or calculated according to the third PMIs, or a third PMI corresponding to a maximum throughput measured or calculated according to the third PMIs, which is not limited in the embodiment.

Optionally, the terminal may select an RI corresponding to the optimal third PMI as the second RI according to the third PMI.

The preset mapping rule among the first PMI, the RI set in the codebook set and the third PMI may include that:

the third PMI may be a PMI which has a minimum distance from the first PMI in the PMI set corresponding to each RI in the codebook set, and the distance is a distance between the first L column of a precoding matrix indicated by each PMI in the PMI set and the first L column of a precoding matrix indicated by the first PMI, where L is a preset positive integer, and L is less than or equal to the smallest one of the first RI and the second RI; or the third PMI may be a PMI which has a maximum correlation value with the first PMI in the PMI set corresponding to each RI in the codebook set, and the correlation value is a correlation value between the first L column of a precoding matrix indicated by each PMI in the PMI set and the first L column of a precoding matrix indicated by the first PMI, where L is a preset positive integer, and L is less than or equal to the smallest one of the first RI and the second RI.

The terminal may receive a value of the L transmitted by the base station via the high-level signaling, or may obtain a value of the L according to a pre-configuration such as a protocol agreement, which is not limited in the embodiment.

Optionally, in a possible implementation of the embodiment, the terminal may not report the second RI and/or the second PMI at a moment for reporting the RI and/or the PMI and directly discard the second RI and/or the second PMI, in a case that the terminal adopts a reporting ways of periodicity physical uplink control channel (PUCCH).

Optionally, in a possible implementation of the embodiment, in a case that the terminal does not adopt the reporting way of periodicity PUCCH, the CSI may be reported by the following reporting periods.

For example, a reporting periodicity for reporting the first RI by the terminal is $M_1$ times of a least common multiple of a reporting periodicity for reporting the first PMI by the terminal and a reporting periodicity for reporting the second PMI by the terminal, where $M_1$ is a preset positive integer.

For another example, a reporting periodicity for reporting the first RI by the terminal is $M_2$ times of a least common multiple of a reporting periodicity for reporting the first CQI by the terminal and a reporting periodicity for reporting the second CQI by the terminal, where $M_1$ is a preset positive integer.

For another example, a reporting periodicity for reporting the first PMI by the terminal is $M_3$ times of a least common multiple of a reporting periodicity for reporting the first CQI by the terminal and a reporting periodicity for reporting the second CQI by the terminal, where $M_1$ is a preset positive integer.

Therefore, the terminal may perform the reporting in one of the following reporting order:

reporting the first RI, reporting the first PMI, reporting the second PMI, reporting the first CQI, reporting the second CQI, reporting the first RI, . . . ; or reporting the first RI, reporting the first PMI, reporting the first CQI, reporting the second PMI, reporting the second CQI, reporting the first RI, . . . ; or reporting the first RI, reporting the second RI, reporting the first PMI, reporting the first CQI, reporting the second CQI, reporting the first RI, . . . ; or reporting the first RI, reporting the first PMI, reporting the first CQI, reporting the second CQI, reporting the first RI, . . . .

Optionally, in a possible implementation of the embodiment, in a case that the terminal adopts the reporting way of periodicity PUCCH, the terminal may report the CSI by the following reporting periods:

the reporting periodicity of the first RI is equal to the reporting periodicity of the second RI; or the reporting periodicity of the first RI is integral multiple of the reporting periodicity of the second RI; or the reporting periodicity of the second RI is integral multiple of the reporting periodicity of the first RI.

Optionally, in a possible implementation of the embodiment, in a case that the terminal adopts the reporting way of periodicity PUCCH, the terminal may report the CSI by the following ways.

In one way, a subframe offset of a reporting subframe of the second RI relative to a reporting subframe of the first RI that is prior to the reporting subframe of the second RI and is closest to the reporting subframe of the second RI is greater than 0.

In another way, a subframe offset of a reporting subframe of the second RI relative to a reporting subframe of the first RI that is prior to the reporting subframe of the second RI and is closest to the reporting subframe of the second RI is greater than 0 and less than a first threshold A. A is a positive integer not greater than the reporting periodicity of the first RI, or a positive integer not greater than the reporting periodicity of the second RI, or a positive integer not greater than the reporting periodicity of the first CQI, or a positive integer not greater than the reporting periodicity of the second CQI.

In another way, the reporting periodicity of the first RI is equal to the reporting periodicity of the second RI, and a subframe offset of a reporting subframe of the second RI relative to a reporting subframe of the first RI that is prior to the reporting subframe of the second RI and is closest to the reporting subframe of the second RI is greater than 0.

In another way, the reporting periodicity of the first RI is equal to the reporting periodicity of the second RI, and a subframe offset of a reporting subframe of the second RI relative to a reporting subframe of the first RI that is prior to the reporting subframe of the second RI and is closest to the reporting subframe of the second RI is greater than 0 and less than a first threshold A. A is a positive integer not greater than the reporting periodicity of the first RI, or a positive integer not greater than the reporting periodicity of the second RI, or a positive integer not greater than the reporting periodicity of the first CQI, or a positive integer not greater than the reporting periodicity of the second CQI In another way, the reporting periodicity of the first RI is equal to the reporting periodicity of the second RI, the reporting periodicity of the first PMI is equal to the reporting periodicity of the second PMI, the reporting periodicity of the first CQI is equal to the reporting periodicity of the second CQI, a subframe offset of the second RI relative to the second CQI is equal to a subframe offset of the first RI relative to the first CQI, and the subframe offset of the second CQI is greater than the subframe offset of the first CQI. For example, the reporting subframe of the first RI is a subframe satisfying $(10 \times n_f + \lfloor n_s/2 \rfloor - N_{OFFSET,CQI1} - N_{OFFSET,RI1}) \mod(H_1 \cdot N_{pd1} \cdot M_{RI1}) = 0$, the reporting subframe of the second RI is a subframe satisfying $(10 \times n_f + \lfloor n_s/2 \rfloor - N_{OFFSET,CQI2} - N_{OFFSET,RI2}) \mod(H_2 \cdot N_{pd2} \cdot M_{RI2}) = 0$, where $10 \times n_f + \lfloor n_s/2 \rfloor$ is a number of the subframe, $N_{pd1}$ is the reporting periodicity of the first CQI, $N_{pd2}$ is the reporting periodicity of the second CQI, $H_1 \cdot N_{pd1}$ is the reporting periodicity of the first PMI, $H_2 \cdot N_{pd2}$ is the reporting periodicity of the second PMI, $H_1 \cdot N_{pd1} \cdot M_{RI1}$ is the reporting periodicity of the first RI, $H_2 \cdot N_{pd2} \cdot M_{RI2}$ is the reporting periodicity of the second RI, $N_{OFFSET,CQI1}$ is the subframe offset of the first CQI, $N_{OFFSET,CQI2}$ is the subframe offset of the second CQI, $N_{OFFSET,RI1}$ is the subframe offset of the first RI relative to the first CQI, $N_{OFFSET,RI2}$ is the subframe offset of the second RI relative to the second CQI, therefore, $N_{pd2} = N_{pd1}$, $H_2 \cdot N_{pd2} = H_1 \cdot N_{pd1}$, $H_2 \cdot N_{pd2} \cdot M_{RI2} = H_1 \cdot N_{pd1} \cdot M_{RI1}$, $N_{OFFSET,RI2} = N_{OFFSET,RI1}$, $N_{OFFSET,CQI2} > N_{OFFSET,CQI1}$.

In another way, the reporting periodicity of the first RI is equal to the reporting periodicity of the second RI, the reporting periodicity of the first PMI is equal to the reporting periodicity of the second PMI, the reporting periodicity of the first CQI is equal to the reporting periodicity of the second CQI, a subframe offset of the second CQI is greater than a subframe offset of the first RI, a subframe offset of the second RI is greater than a subframe offset of the first RI and less than or equal to the subframe offset of the second CQI, a subframe offset of the second RI relative to the second CQI is less than or equal to 0 and greater than an opposite number of the reporting periodicity of the second CQI. For example, the reporting subframe of the first RI is a subframe satisfying $(10 \times n_f + \lfloor n_s/2 \rfloor - N_{OFFSET,CQI1} - N_{OFFSET,RI1}) \mod (H_1 \cdot N_{pd1} \cdot M_{RI1}) = 0$, the reporting subframe of the second RI is a subframe satisfying $(10 \times n_f + \lfloor n_s/2 \rfloor - N_{OFFSET,CQI2} - N_{OFFSET,RI2}) \mod(H_2 \cdot N_{pd2} \cdot M_{RI2}) = 0$, where $10 \times n_f + \lfloor n_s/2 \rfloor$ is a number of the subframe, $N_{pd1}$ is the reporting periodicity of the first CQI, $N_{pd2}$ is the reporting periodicity of the second CQI, $H_1 \cdot N_{pd1}$ is the reporting periodicity of the first PMI, $H_2 \cdot N_{pd2}$ is the reporting periodicity of the second PMI, $H_1 \cdot N_{pd1} \cdot M_{RI1}$ is the reporting periodicity of the first RI, $H_2 \cdot N_{pd2} \cdot M_{RI2}$ is the reporting periodicity of the second RI, $N_{OFFSET,CQI1}$ is the subframe offset of the first CQI, $N_{OFFSET,CQI2}$ is the subframe offset of the second CQI, $N_{OFFSET,CQI1}+N_{OFFSET,RI1}$ is the subframe offset of the first RI, $N_{OFFSET,CQI2}+N_{OFFSET,RI2}$ is the subframe offset of the second RI, $N_{OFFSET,RI1}$ is the subframe offset of the first RI relative to the first CQI, $N_{OFFSET,RI2}$ is the subframe offset of the second RI relative to the second CQI, therefore, $N_{pd2}=N_{pd1}$, $H_2 \cdot N_{pd2}=H_1 \cdot N_{pd1}$, $H_2 \cdot N_{pd2} \cdot M_{RI2}=H_1 \cdot N_{pd1} \cdot M_{RI1}$, $N_{OFFSET,CQI2}>N_{OFFSET,CQI1}+N_{OFFSET,RI1}$, $N_{OFFSET,CQI2}+N_{OFFSET,RI2}>N_{OFFSET,CQI1}+N_{OFFSET,RI1}$ and $N_{OFFSET,CQI2}+N_{OFFSET,RI2}\leq N_{OFFSET,CQI2}$ and $-N_{pd2}<N_{OFFSET,RI2}\leq 0$, i.e., the value of $N_{OFFSET,RI2}$ falls within the range of $\{0, -1, -2, \ldots, \max(N_{OFFSET,RI1}+N_{OFFSET,CQI1}-N_{OFFSET,CQI2}+1, -(N_{pd2}-1))\}$.

The reporting subframe of the second RI is a subframe for reporting the second RI, and the reporting subframe of the first RI is a subframe for reporting the first RI.

It should be noted that, the mapping rule mentioned in the embodiment may be directly a correspondence of mapping results, and the CSI may be obtained by directly querying the correspondence of the mapping results.

In the embodiment, first CSI including a first RI, a first PMI and a first CQI is measured and reported to a base station by the terminal; a second RI and/or a second PMI are obtained according to the first CSI, such that the terminal can measure a PMI and a CQI that correspond to the second RI by using the second RI and report the PMI and the CQI to the base station, or the terminal can measure a CQI that corresponds the second RI and the second PMI by using the second RI and the second PMI and report the CQI to the base station, or the terminal can measure an RI and a CQI that correspond to the second PMI by using the second PMI and report the RI and the CQI to the base station. In this way, the terminal does not need to measure all content in the CSI under each condition, thus the complexity of the terminal is reduced.

In addition, since the terminal does not report the second RI and/or the second PMI obtained in step 102 in step 103, the base station needs to obtain the second RI and/or the second PMI by using a method similar to the above obtaining method of the terminal, that is, the base station also needs to perform the step of obtaining the second RI and/or the second PMI according to the first CSI, and the detailed description may refer to the related content in step 102, which is not described herein. In addition, since the terminal does not need to report all content in the CSI under each condition, the overhead of the reporting can be reduced.

Optionally, in a possible implementation of the embodiment, the terminal may further report the second RI and/or the second PMI to the base station after step 102, such that the base station obtains the second RI and/or the second PMI without using the method similar to the above obtaining method of the terminal, i.e., the base station does not need to perform the step of obtaining the second RI and/or the second PMI according to the first CSI.

It should be noted that the above method embodiments are described as a series of actions for simplicity. However, those skilled in the art should understand that the application is not limited to the described order of the actions, since some steps may be performed in other orders or may be performed simultaneously in the application. In addition, those skilled in the art should understand that the embodiments described in the specification are preferred embodiments, and the involved actions and modules may be unnecessary to the application.

In the above embodiments, different emphasis are placed in describing various embodiments, and the portion which is not described in detail in a certain embodiment may refer to the related description of other embodiments.

Figure 2:
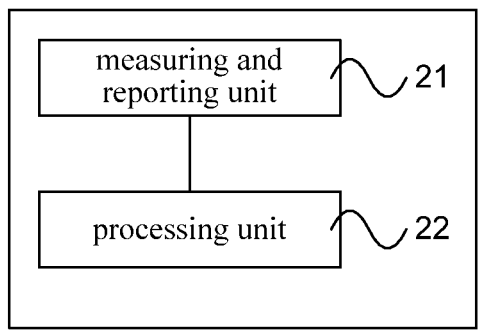
FIG. 2 is a schematic structural diagram of a terminal according to another embodiment of the application.

FIG. 2 is a schematic structural diagram of a terminal according to another embodiment of the application. As shown in FIG. 2, the terminal in the embodiment may include a measuring and reporting unit 21 and a processing unit 22. The measuring and reporting unit 21 is configured to measure first CSI and report the first CSI to a base station, where the first CSI includes a first RI, a first PMI and a first CQI. The processing unit 22 is configured to obtain a second RI and/or a second PMI according to the first CSI. The measuring and reporting unit 21 is further configured to measure a PMI and a CQI that correspond to the second RI by using the second RI and report the PMI and the CQI to the base station, or measure a CQI that corresponds to the second RI and the second PMI by using the second RI and the second PMI and report the CQI to the base station, or measure an RI and a CQI that correspond to the second PMI by using the second PMI and report the RI and the CQI to the base station.

It should be noted that, the first RI, the first PMI and the first CQI included in the first CSI are measured according to a first condition, the second RI and the second PMI are calculated according to a second condition, and other CSI information measured by using the second RI and/or the second PMI are measured according to the second condition. A third PMI described in the following is also calculated according to the second condition. The first condition is different from the second condition.

The first condition and the second condition may include various conditions according to the TP, for example, may include a condition about signal and interference, or a condition about time resource and frequency resource. It will be further illustrated below by examples.

For example, in the first condition, TP1 is a signal TP for transmitting a downlink signal to a terminal and the signal TP transmits the downlink signal with a transmitting power of P1; TP2 is an interference TP interfering with the UE or the interference TP does not transmit a downlink signal. In the second condition, TP2 is a signal TP for transmitting a downlink signal to an UE, and the signal TP transmits the downlink signal with a transmitting power of P2; TP1 is an interference TP interfering with the UE or the interference TP does not transmit a downlink signal.

For another example, in the first condition, TP1 transmits aF downlink signal to a terminal on the system bandwidth within subframe 0; in the second condition, TP1 transmits a downlink signal to a terminal on the system bandwidth within subframe 5, where 0 and 5 are numbers of subframes.

For another example, in the first condition, TP1 transmits a downlink signal to a terminal on the system bandwidth within subframe 0; in the second condition, TP1 transmits a downlink signal to a terminal on subband 1 and subband 6 within subframe 5, where 0 and 5 are numbers of subframes, 1 and 6 are numbers of subbands, and the subband is a portion of the system bandwidth.

Optionally, in a possible implementation of the embodiment, the processing unit 22 may obtain the second RI and/or the second PMI according to the first CSI in a case that the terminal further needs to report multiple CSIs simultaneously, i.e., in a case that a collision may occur.

Optionally, in a possible implementation of the embodiment, the processing unit 22 may obtain the second RI corresponding to the first RI according to a preset mapping rule between the first RI and the second RI.

Optionally, in a possible implementation of the embodiment, the processing unit 22 may obtain a first offset corresponding to the first RI according to a preset mapping rule between the first RI and the first offset, and take a sum of the first RI and the first offset as the second RI.

Optionally, in a possible implementation of the embodiment, the processing unit 22 may obtain the second RI corresponding to the first RI and the first CQI according to a preset mapping rule among the first RI, the first CQI and the second RI.

Optionally, in a possible implementation of the embodiment, the processing unit 22 may obtain a second offset corresponding to the first RI and the first CQI according to a preset mapping rule among the first RI, the first CQI and the second offset, and take a sum of the first RI and the second offset as the second RI.

Optionally, in a possible implementation of the embodiment, the processing unit 22 may obtain the second RI corresponding to the first RI, the number of antenna ports and the first CQI according to a preset mapping rule among the first RI, the number of antenna ports, the first CQI and the second RI. The number of antenna ports may include but is not limited to the number of receiving antenna ports of the terminal and/or the number of transmitting antenna ports of the base station.

Optionally, in a possible implementation of the embodiment, the processing unit 22 may obtain a third offset corresponding to the first RI, the number of antenna ports and the first CQI according to a preset mapping rule among the first RI, the number of antenna ports, the first CQI and the third offset, and take a sum of the first RI and the third offset as the second RI. The number of antenna ports may include but is not limited to the number of receiving antenna ports of the terminal and/or the number of transmitting antenna ports of the base station.

Figure 3:
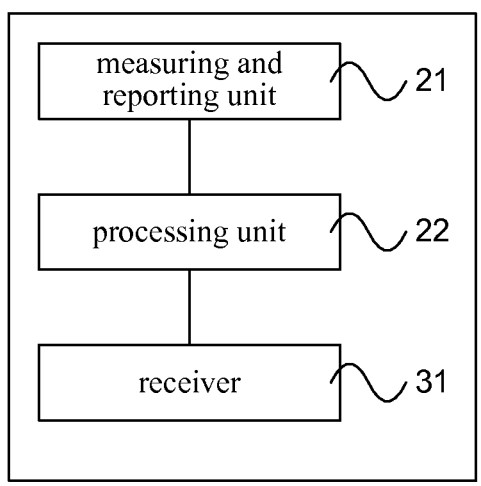
FIG. 3 is a schematic structural diagram of a terminal according to another embodiment of the application.

As shown in FIG. 3, the processing unit may further include a receiver 31, which is configured to receive one of the mapping rules transmitted by the base station via a high-level signaling. The terminal may obtain all mapping rules mentioned later in this way, which is not described in the following.

For example, the high-level signaling may be a radio resource control (RRC) message, and a mapping rule may be carried by an information element (IE) in the RRC message. The RRC message may be a conventional RRC message such as a RRC connection reconfiguration message, which is not limited in the embodiment. The IE of the conventional RRC message may be extended to carry one of the mapping rules. Alternatively, the RRC message may be different from the conventional RRC message.

For another example, the high-level signaling may be a media access control (MAC) control element (CE) message, and a new MAC CE message may be added to carry one of the mapping rules.

The terminal does not include the receiver to receive one of the mapping rules transmitted by the base station via the high-level signaling, instead the processing unit 22 may directly obtain one of the mapping rules by a pre-configuration such as a protocol agreement. The terminal may obtain all mapping rules mentioned later in this way, which is not described in the following.

Optionally, in a possible implementation of the embodiment, the processing unit 22 may obtain the second RI according to the first CSI, and obtain the second PMI according to the first CSI and the second RI.

The processing unit 22 may obtain the second PMI corresponding to the first PMI and the second RI according to a preset mapping rule among the first PMI, the second RI and the second PMI.

The preset mapping rule among the first PMI, the second RI and the second PMI may include that:

the second PMI may be a PMI which has a minimum distance from the first PMI in a PMI set corresponding to the second RI in a codebook set, and the distance is a distance between the first L column of a precoding matrix indicated by each PMI in the PMI set and the first L column of a precoding matrix indicated by the first PMI, where L is a preset positive integer and L is less than or equal to the smallest one of the first RI and the second RI; or the second PMI may be a PMI which has a maximum correlation value with the first PMI in the PMI set corresponding to the second RI in a codebook set, and the correlation value is a correlation value between the first L column of a precoding matrix indicated by each PMI in the PMI set and the first L column of a precoding matrix indicated by the first PMI, where L is a preset positive integer, and L is less than or equal to the smallest one of the first RI and the second RI.

The terminal may receive a value of the L transmitted by the base station via the high-level signaling, or may obtain a value of the L according to a pre-configuration such as a protocol agreement, which is not limited in the embodiment.

Optionally, in a possible implementation of the embodiment, the processing unit 22 may obtain third PMIs corresponding to the PMI and each RI in an RI set in a codebook set according to a preset mapping rule among the first PMI, the RI set in the codebook set and the third PMI, and select an optimal third PMI as the second PMI according to the third PMIs. The optimal third PMI may be a third PMI corresponding to a maximum signal-noise ratio measured or calculated according to the third PMIs, or a third PMI corresponding to a maximum CQI measured or calculated according to the third PMIs, or a third PMI corresponding to a maximum throughput measured or calculated according to the third PMIs, which is not limited in the embodiment.

Optionally, the processing unit 22 may select an RI corresponding to the optimal third PMI as the second RI according to the third PMI.

The preset mapping rule among the first PMI, the RI set in the codebook set and the third PMI may include that:

the third PMI may be a PMI which has a minimum distance from the first PMI in the PMI set corresponding to each RI in the codebook set, and the distance is a distance between the first L column of a precoding matrix indicated by each PMI in the PMI set and the first L column of a precoding matrix indicated by the first PMI, where L is a preset positive integer, and L is less than or equal to the smallest one of the first RI and the second RI; or the third PMI may be a PMI which has a maximum correlation value with the first PMI in the PMI set corresponding to each RI in the codebook set, and the correlation value is a correlation value between the first L column of a precoding matrix indicated by each PMI in the PMI set and the first L column of a precoding matrix indicated by the first PMI, where L is a preset positive integer, and L is less than or equal to the smallest one of the first RI and the second RI.

The terminal may receive a value of L transmitted by the base station via the high-level signaling, or may obtain a value of L according to a pre-configuration such as a protocol agreement, which is not limited in the embodiment.

Optionally, in a possible implementation of the embodiment, the measuring and reporting unit 21 may not report the second RI and/or the second PMI at a moment for reporting the RI and/or the PMI, in a case that the terminal adopts a reporting way of periodicity PUCCH.

Optionally, in a possible implementation of the embodiment, in a case that the terminal does not adopt the reporting way of periodicity PUCCH, the measuring and reporting unit 21 may report the CSI by the following reporting periods.

For example, a reporting periodicity for reporting the first RI by the measuring and reporting unit 21 is $M_1$ times of a least common multiple of a reporting periodicity for reporting the first PMI by the measuring and reporting unit 21 and a reporting periodicity for reporting the second PMI by the measuring and reporting unit 21, where $M_1$ is a preset positive integer.

For another example, a reporting periodicity for reporting the first RI by the measuring and reporting unit 21 is $M_2$ times of a least common multiple of a reporting periodicity for reporting the first CQI by the measuring and reporting unit 21 and a reporting periodicity for reporting the second CQI by the measuring and reporting unit 21, where $M_1$ is a preset positive integer.

For another example, a reporting periodicity for reporting the first PMI by the measuring and reporting unit 21 is $M_3$ times of a least common multiple of the reporting periodicity for reporting the first CQI by the measuring and reporting unit 21 and a reporting periodicity for reporting the second CQI by the measuring and reporting unit 21, where $M_1$ is a preset positive integer.

Optionally, in a possible implementation of the embodiment, in a case that the terminal adopts the reporting way of periodicity PUCCH, the measuring and reporting unit 21 may report the CSI by the following reporting periods.

For example, the reporting periodicity for reporting the first RI by the measuring and reporting unit 21 is equal to the reporting periodicity for reporting the second RI by the measuring and reporting unit 21.

For another example, the reporting periodicity for reporting the first RI by the measuring and reporting unit 21 is integral multiple of the reporting periodicity for reporting the second RI by the measuring and reporting unit 21.

For another example, the reporting periodicity for reporting the second RI by the measuring and reporting unit 21 is integral multiple of the reporting periodicity for reporting the first RI by the measuring and reporting unit 21.

Optionally, in a possible implementation of the embodiment, in a case that the terminal adopts the reporting way of periodicity PUCCH, the measuring and reporting unit 21 may report the CSI by the following ways.

For example, a subframe offset of a reporting subframe of the second RI reported by the measuring and reporting unit 21 relative to a reporting subframe of the first RI reported that is prior to the reporting subframe of the second RI and is closest to the reporting subframe of the second RI reported by the measuring and reporting unit 21 is greater than 0.

For another example, a subframe offset of the reporting subframe of the second RI reported by the measuring and reporting unit 21 relative to the reporting subframe of the first RI reported by the measuring and reporting unit 21 that is prior to the reporting subframe of the second RI and is closest to the reporting subframe of the second RI reported by the measuring and reporting unit 21 is greater than 0 and less than a first threshold A. A is a positive integer not greater than the reporting periodicity of the first RI, or a positive integer not greater than the reporting periodicity of the second RI, or a positive integer not greater than the reporting periodicity of the first CQI, or a positive integer not greater than the reporting periodicity of the second CQI.

For another example, the reporting periodicity for reporting the first RI by the measuring and reporting unit 21 is equal to the reporting periodicity for reporting the second RI by the measuring and reporting unit 21, and a subframe offset of the reporting subframe of the second RI reported by the measuring and reporting unit 21 relative to the reporting subframe of the first RI that is prior to the reporting subframe of the second RI and is closest to the reporting subframe of the second RI reported by the measuring and reporting unit 21 is greater than 0.

For another example, the reporting periodicity for reporting the first RI by the measuring and reporting unit 21 is equal to the reporting periodicity for reporting the second RI by the measuring and reporting unit 21, and a subframe offset of the reporting subframe of the second RI reported by the measuring and reporting unit 21 relative to the reporting subframe of the first RI that is prior to the reporting subframe of the second RI and is closest to the reporting subframe of the second RI reported by the measuring and reporting unit 21 is greater than 0 and less than a first threshold. A is a positive integer not greater than the reporting periodicity of the first RI, or a positive integer not greater than the reporting periodicity of the second RI, or a positive integer not greater than the reporting periodicity of the first CQI, or a positive integer not greater than the reporting periodicity of the second CQI.

For another example, the reporting periodicity for reporting the first RI by the measuring and reporting unit 21 is equal to the reporting periodicity for reporting the second RI by the measuring and reporting unit 21, the reporting periodicity for reporting the first PMI by the measuring and reporting unit 21 is equal to the reporting periodicity for reporting the second PMI by the measuring and reporting unit 21, the reporting periodicity for reporting the first CQI by the measuring and reporting unit 21 is equal to the reporting periodicity for reporting the second CQI by the measuring and reporting unit 21, a subframe offset of the reporting subframe of the second RI reported by the measuring and reporting unit 21 relative to the reporting subframe of the second CQI reported by the measuring and reporting unit 21 is equal to a subframe offset of the reporting subframe of the first RI reported by the measuring and reporting unit 21 relative to the reporting subframe of the first CQI reported by the measuring and reporting unit 21, and a subframe offset of the second CQI reported by the measuring and reporting unit 21 is greater than a subframe offset of the first CQI reported by the measuring and reporting unit 21.

For another example, the reporting periodicity for reporting the first RI by the measuring and reporting unit 21 is equal to the reporting periodicity for reporting the second RI by the measuring and reporting unit 21, the reporting periodicity for reporting the first PMI by the measuring and reporting unit 21 is equal to the reporting periodicity for reporting the second PMI by the measuring and reporting unit 21, the reporting periodicity for reporting the first CQI by the measuring and reporting unit 21 is equal to the reporting periodicity for reporting the second CQI by the measuring and reporting unit 21, a subframe offset of the second CQI reported by the measuring and reporting unit 21 is greater than a subframe offset of the first RI reported by the measuring and reporting unit 21, a subframe offset of the second RI reported by the measuring and reporting unit 21 is greater than a subframe offset of the first RI reported by the measuring and reporting unit 21 and less than or equal to a subframe offset of the second CQI reported by the measuring and reporting unit 21, a subframe offset of the reporting subframe of the second RI reported by the measuring and reporting unit 21 relative to the reporting subframe of the second CQI reported by the measuring and reporting unit 21 is less than or equal to 0, and greater than an opposite number of the reporting periodicity for reporting the second CQI by the measuring and reporting unit 21.

The reporting subframe of the second RI is a subframe for reporting the second RI, and the reporting subframe of the first RI is a subframe for reporting the first RI.

It should be noted that, the mapping rule mentioned in the embodiment may be directly a correspondence of mapping results, and the CSI may be obtained by directly querying the correspondence of the mapping results.

In the embodiment, first CSI including a first RI, a first PMI and a first CQI is measured and reported to a base station by the measuring and reporting unit of the terminal; a second RI and/or a second PMI are obtained according to the first CSI by the processing unit, such that the measuring and reporting unit can measure a PMI and a CQI that correspond to the second RI by using the second RI and report the PMI and the CQI to the base station, or measure a CQI that corresponds the second RI and the second PMI by using the second RI and the second PMI and report the CQI to the base station, or measure an RI and a CQI that correspond to the second PMI by using the second PMI and report the RI and the CQI to the base station. In this way, the terminal does not need to measure all content in the CSI under each condition, thus the complexity of the terminal is reduced.

In addition, since the measuring and reporting unit does not report the second RI and/or the second PMI obtained by the processing unit 22, the base station needs to obtain the second RI and/or the second PMI by using the execution method similar to the processing unit 22, that is, the base station also needs to obtain the second RI and/or the second PMI according to the first CSI, and the detailed description may refer to the related content of the processing unit 22, which is not described herein. In addition, since the measuring and reporting unit 21 does not need to report all content in the CSI under each condition, the overhead of the reporting can be reduced.

Optionally, in a possible implementation of the embodiment, the measuring and reporting unit 21 may further report the second RI and/or the second PMI to the base station after step 102, such that the base station obtains the second RI and/or the second PMI without using the execution method similar to the processing unit 22, i.e., the base station does not need to obtain the second RI and/or the second PMI according to the first CSI.

It can be known by those skilled in the art that the execution processes of the systems, apparatuses or units described above may refer to the corresponding process in the method embodiments for simplicity, which is not described herein.

In the embodiments provided by the application, it should be understood that the disclosed systems, apparatuses and methods may be implemented by other ways. For example, the apparatus embodiments described above are only illustrative. For example, the division of the units is only a division based on logical functions, and other division ways may be used in practice. For example, multiple units or components may be combined together or may be integrated into another system, or some features may be ignored or may not be performed. In addition, the apparatuses or units may be coupled or directly coupled or communication connected via some interfaces, and the coupling or connection may be electric, mechanical or in other forms.

The units illustrated as the discrete components may be separate physically or not. The components illustrated as the units may be physical units or not, i.e., the components may be located in one place, or may be distributed on multiple network units. Some or all of the units may be selected to achieve the objects of the solutions of the embodiment as needed.

In addition, various functional units in various embodiments of the application may be integrated in one processing unit, or various units exist independently physically, or two or more units may be integrated in one unit. The integration of the units described above may be implemented by hardware or may be implemented by a combination of hardware and a software functional unit.

The integrated unit implemented by the form of the software functional unit described above may be stored in a computer readable storage medium. The software functional unit is stored in a storage medium, including several instructions for causing a computer device (which may be a personal computer, a server, or a network device and so on) or a processor to perform some steps of the methods described in various embodiments of the application. The storage medium includes various mediums which may store program codes, such as a USB disc, a mobile hard disc, a read-only memory (ROM), a random access memory (RAM), a magnetic disc or a compact disc.

It should be noted that, the above embodiments are only used to illustrate the technical solutions of the application and not intended to limit the application. Although the application is illustrated in detail by referring to the preceding embodiments, those skilled in the art may understand that the technical solutions recoded in the preceding embodiments may be changed, or some of the technical features may be substituted equivalently, and these changes or substitutions do not cause the essence of the corresponding technical solutions to depart from the spirit and scope of the technical solutions of various embodiments of the invention.

What is claimed is:

1. A method for processing channel status information (CSI), comprising:

measuring, by a terminal, first CSI and reporting the first CSI to a base station, wherein the first CSI comprises a first rank indicator (RI), a first precoding matrix indicator (PMI) and a first channel quality indicator (CQI);

obtaining, by the terminal, at least a second RI according to the first CSI; and measuring, by the terminal at least one of:

a second PMI and a second CQI that correspond to the second RI by using the second RI, and reporting the second PMI and the second CQI that correspond to the second RI to the base station; and the second CQI that corresponds to the second RI and the second PMI by using the second RI and the second PMI, and reporting the second CQI that corresponds to the second RI and the second PMI to the base station, wherein the obtaining, by the terminal, at least the second RI according to the first CSI comprises:

obtaining, by the terminal, the second RI corresponding to the first RI, a number of antenna ports, and the first CQI according to a preset mapping rule among the first RI, the number of antenna ports, the first CQI, and the second RI; or obtaining, by the terminal, an offset amount corresponding to the first RI, the number of antenna ports, and the first CQI according to a preset mapping rule among the first RI, the number of antenna ports, the first CQI, and the offset amount, and taking a sum of the first RI and the offset amount as the second RI.

2. The method according to claim 1, wherein the obtaining, by the terminal, at least the second RI according to the first CSI comprises:
obtaining, by the terminal, at least the second RI according to the first CSI in a case that the terminal further needs to report a plurality of CSIs simultaneously.

3. The method according to claim 1, wherein the obtaining, by the terminal, at least the second RI according to the first CSI comprises:
obtaining, by the terminal, the second RI according to the first CSI; and
obtaining, by the terminal, the second PMI according to the first CSI and the second RI.

4. The method according to claim 3, wherein the obtaining, by the terminal, the second PMI according to the first CSI and the second RI comprises:
obtaining, by the terminal, the second PMI corresponding to the first PMI and the second RI according to a preset mapping rule among the first PMI, the second RI and the second PMI.

5. The method according to claim 4, wherein the preset mapping rule among the first PMI, the second RI and the second PMI comprises that:
the second PMI is a PMI which has a minimum distance from the first PMI in a PMI set corresponding to the second RI in a codebook set, and the distance is a distance between the first L columns of a precoding matrix indicated by each PMI in the PMI set and the first L columns of a precoding matrix indicated by the first PMI, wherein L is a preset positive integer and L is less than or equal to a smallest one of the first RI and the second RI; or
the second PMI is a PMI which has a maximum correlation value with the first PMI in a PMI set corresponding to the second RI in a codebook set, and the correlation value is a correlation value between the first L columns of a precoding matrix indicated by each PMI in the PMI set and the first L columns of a precoding matrix indicated by the first PMI, wherein L is a preset positive integer and L is less than or equal to a smallest one of the first RI and the second RI.

6. The method according to claim 1, wherein the number of antenna ports comprises one or more of: a number of receiving antenna ports of the terminal, and a number of transmitting antenna ports of the base station.

7. A terminal, comprising:
a measuring and reporting unit, configured to measure first channel status information (CSI) and report the first CSI to a base station, wherein the first CSI comprises a first rank indicator (RI), a first precoding matrix indicator (PMI) and a first channel quality indicator (CQI); and
a processing unit, configured to obtain at least a second RI according to the first CSI;
wherein the measuring and reporting unit is further configured to:
measure a second PMI and a second CQI that correspond to the second RI by using the second RI, and report the second PMI and the second CQI that correspond to the second RI to the base station; or
measure the second CQI that corresponds to the second RI and the second PMI by using the second RI and the second PMI, and report the second CQI that corresponds to the second RI and the second PMI to the base station,
wherein the processing unit is further configured to:
obtain the second RI corresponding to the first RI, a number of antenna ports and the first CQI according to a preset mapping rule among the first RI, the number of antenna ports, the first CQI, and the second RI; or
obtain an offset amount corresponding to the first RI, the number of antenna ports, and the first CQI according to a preset mapping rule among the first RI, the number of antenna ports, the first CQI, and the offset amount, and take a sum of the first RI and the offset amount as the second RI.

8. The terminal according to claim 7, wherein the processing unit is configured to obtain at least the second RI according to the first CSI in a case that the terminal further needs to report a plurality of CSIs simultaneously.

9. The terminal according to claim 7, wherein the processing unit is configured to obtain the second RI according to the first CSI and obtain the second PMI according to the first CSI and the second RI.

10. The terminal according to claim 9, wherein the processing unit is configured to obtain the second PMI corresponding to the first PMI and the second RI according to a preset mapping rule among the first PMI, the second RI and the second PMI.

11. The terminal according to claim 10, wherein the preset mapping rule among the first PMI, the second RI and the second PMI comprises that:
the second PMI is a PMI which has a minimum distance from the first PMI in a PMI set corresponding to the second RI in a codebook set, and the distance is a distance between the first L columns of a precoding matrix indicated by each PMI in the PMI set and the first L columns of a precoding matrix indicated by the first PMI, wherein L is a preset positive integer and L is less than or equal to a smallest one of the first RI and the second RI; or
the second PMI is a PMI which has a maximum correlation value with the first PMI in a PMI set corresponding to the second RI in a codebook set, and the correlation value is a correlation value between the first L columns of a precoding matrix indicated by each PMI in the PMI set and the first L columns of a precoding matrix indicated by the first PMI, wherein L is a preset positive integer and L is less than or equal to a smallest one of the first RI and the second RI.

12. The terminal according to claim 7, wherein the processing unit is configured to obtain third PMIs corresponding to the first PMI and each RI in an RI set in a codebook set according to a preset mapping rule among the first PMI, the RI set in the codebook set and the third PMIs, and select an optimal one of the third PMIs as the second PMI.

13. The terminal according to claim 11, wherein the preset mapping rule among the first PMI, the RI set in the codebook set and the third PMI comprises that:
the third PMI is a PMI which has a minimum distance from the first PMI in a PMI set corresponding to each RI in the codebook set, and the distance is a distance between the first L columns of a precoding matrix indicated by each PMI in the PMI set and the first L columns of a precoding matrix indicated by the first PMI, wherein L is a preset positive integer and L is less than or equal to a smallest one of the first RI and the second RI; or the third PMI is a PMI which has a maximum correlation value with the first PMI in a PMI set corresponding to each RI in the codebook set, and the correlation value is a correlation value between the first L columns of a precoding matrix indicated by each PMI in the PMI set and the first L columns of a precoding matrix indicated by the first PMI, wherein L is a preset positive integer and L is less than or equal to a smallest one of the first RI and the second RI.

14. The terminal according to claim 7, wherein the measuring and reporting unit is configured to not report one or more of the second RI and the second PMI at a moment for reporting one or more of the RI and the PMI, in response to the terminal adopting a reporting way of periodicity physical uplink control channel (PUCCH).

15. The terminal according to claim 7, wherein in response to the terminal not adopting a reporting way of periodicity physical uplink control channel (PUCCH), a reporting periodicity for reporting the first RI by the measuring and reporting unit is $M_1$ times of a least common multiple of a reporting periodicity for reporting the first PMI by the measuring and reporting unit and a reporting periodicity for reporting the second PMI by the measuring and reporting unit, wherein $M_1$ is a preset positive integer; or a reporting periodicity for reporting the first RI by the measuring and reporting unit is $M_2$ times of a least common multiple of a reporting periodicity for reporting the first CQI by the measuring and reporting unit and a reporting periodicity for reporting the second CQI by the measuring and reporting unit, wherein $M_2$ is a preset positive integer; or a reporting periodicity for reporting the first PMI by the measuring and reporting unit is $M_3$ times of a least common multiple of a reporting periodicity for reporting the first CQI by the measuring and reporting unit and a reporting periodicity for reporting the second CQI by the measuring and reporting unit, wherein $M_3$ is a preset positive integer.

16. The terminal according to claim 7, wherein the measuring and reporting unit is further configured to report one or more of the second RI and the second PMI to the base station.

17. The terminal according to claim 16, wherein in response to the terminal adopting a periodicity reporting way, a first reporting periodicity for reporting the first RI by the measuring and reporting unit is equal to a second reporting periodicity for reporting the second RI by the measuring and reporting unit; or the first reporting periodicity for reporting the first RI by the measuring and reporting unit is equal to integral multiple of the second reporting periodicity for reporting the second RI by the measuring and reporting unit; or the second reporting periodicity for reporting the second RI by the measuring and reporting unit is equal to integral multiple of the first reporting periodicity for reporting the first RI by the measuring and reporting unit; or a second subframe offset of a second reporting subframe of the second RI reported by the measuring and reporting unit relative to a first reporting subframe of the first RI that is prior to the second reporting subframe of the second RI and is closest to the second reporting subframe of the second RI reported by the measuring and reporting unit is greater than 0; or the second subframe offset of the second reporting subframe of the second RI reported by the measuring and reporting unit relative to the first reporting subframe of the first RI that is prior to the second reporting subframe of the second RI and is closest to the second reporting subframe of the second RI reported by the measuring and reporting unit is greater than 0 and less than a first threshold; or the first reporting periodicity for reporting the first RI by the measuring and reporting unit is equal to the second reporting periodicity for reporting the second RI by the measuring and reporting unit, and the second subframe offset of the second reporting subframe of the second RI reported by the measuring and reporting unit relative to the first reporting subframe of the first RI that is prior to the second reporting subframe of the second RI and is closest to the second reporting subframe of the second RI reported by the measuring and reporting unit is greater than 0; or the first reporting periodicity for reporting the first RI by the measuring and reporting unit is equal to the second reporting periodicity for reporting the second RI by the measuring and reporting unit, and the second subframe offset of the second reporting subframe of the second RI reported by the measuring and reporting unit relative to the first reporting subframe of the first RI that is prior to the second reporting subframe of the second RI and is closest to the second reporting subframe of the second RI reported by the measuring and reporting unit is greater than 0 and less than the first threshold; or the first reporting periodicity for reporting the first RI by the measuring and reporting unit is equal to the second reporting periodicity for reporting the second RI by the measuring and reporting unit, a third reporting periodicity for reporting the first PMI by the measuring and reporting unit is equal to a fourth reporting periodicity for reporting the second PMI corresponding to the second RI by the measuring and reporting unit, a fifth reporting periodicity for reporting the first CQI by the measuring and reporting unit is equal to a sixth reporting periodicity for reporting the second CQI corresponding to the second RI by the measuring and reporting unit, the second subframe offset of the second reporting subframe of the second RI reported by the measuring and reporting unit relative to a fourth reporting subframe of the second CQI corresponding to the second RI reported by the measuring and reporting unit is equal to a first subframe offset of the first reporting subframe of the first RI reported by the measuring and reporting unit relative to a third reporting subframe of the first CQI reported by the measuring and reporting unit, and a fourth subframe offset of the second CQI corresponding to the second RI reported by the measuring and reporting unit is greater than a third subframe offset of the first CQI reported by the measuring and reporting unit; or the first reporting periodicity for reporting the first RI by the measuring and reporting unit is equal to the second reporting periodicity for reporting the second RI by the measuring and reporting unit, the third reporting periodicity for reporting the first PMI by the measuring and reporting unit is equal to the fourth reporting periodicity for reporting the second PMI corresponding to the second RI by the measuring and reporting unit, the fifth reporting periodicity for reporting the first CQI by the measuring and reporting unit is equal to the sixth reporting periodicity for reporting the second CQI corresponding to the second RI by the measuring and reporting unit, the fourth subframe offset of the second CQI corresponding to the second RI reported by the measuring and reporting unit is greater than the first subframe offset of the first RI reported by the measuring and reporting unit, the second subframe offset of the second RI reported by the measuring and reporting unit is greater than the first subframe offset of the first RI reported by the measuring and reporting unit and less than or equal to the fourth subframe offset of the second CQI corresponding to the second RI reported by the measuring and reporting unit, and the second subframe offset of the second reporting subframe of the second RI reported by the measuring and reporting unit relative to the fourth reporting subframe of the second CQI corresponding to the second RI reported by the measuring and reporting unit is less than or equal to 0 and greater than an opposite number of the sixth reporting periodicity of the second CQI corresponding to the second RI reported by the measuring and reporting unit.

18. The terminal according to claim 17, wherein the first threshold is a positive integer not greater than the reporting periodicity of the first RI; or the first threshold is a positive integer not greater than the reporting periodicity of the second RI; or the first threshold is a positive integer not greater than the reporting periodicity of the first CQI; or the first threshold is a positive integer not greater than the reporting periodicity of the CQI corresponding to the second RI.

19. The terminal according to claim 7, wherein the number of antenna ports comprises one or more of: a number of receiving antenna ports of the terminal, and a number of transmitting antenna ports of the base station.

* * * * *